US012712089B2

(12) United States Patent
Anderson et al.

(10) Patent No.: US 12,712,089 B2

(45) Date of Patent: Aug. 18, 2026

(54) METHODS AND SYSTEMS FOR PARTICLE DIVERSION AND ENHANCED PUMPING EFFICIENCY

(71) Applicant: Type One Energy Group, Inc., Madison, WI (US)

(72) Inventors: David Thomas Anderson, Delafield, WI (US); Thomas Sunn Pedersen, Middleton, WI (US)

(73) Assignee: TYPE ONE ENERGY GROUP, INC., Knoxville, TN (US)

( * ) Notice: Subject to any disclaimer, the term of this patent is extended or adjusted under 35 U.S.C. 154(b) by 0 days.

(21) Appl. No.: 18/823,446

(22) Filed: Sep. 3, 2024

(65) Prior Publication Data

US 2025/0125061 A1 Apr. 17, 2025

Related U.S. Application Data

(60) Provisional application No. 63/649,822, filed on May 20, 2024, provisional application No. 63/550,498, filed on Feb. 6, 2024, provisional application No. 63/589,881, filed on Oct. 12, 2023.

(51) Int. Cl.
*G21B 1/13* (2006.01)
*G21B 1/05* (2006.01)

(52) U.S. Cl.
CPC ................ *G21B 1/13* (2013.01); *G21B 1/055* (2013.01)

(58) Field of Classification Search
CPC ........................................................ G21B 1/13
USPC .......................................................... 376/134
See application file for complete search history.

(56) References Cited

U.S. PATENT DOCUMENTS 3,002,912 A * 10/1961 Spitzer, Jr. ............. G21B 1/055 250/493.1
3,016,341 A * 1/1962 Spitzer, Jr. ............. G21B 1/055 376/150
4,149,931 A 4/1979 Christensen
4,626,399 A 12/1986 Cohen et al.
H984 H * 11/1991 Brooks ..................... G21F 9/02 376/136
2003/0002610 A1 1/2003 Panarella
2010/0046688 A1 2/2010 Kotschenreuther et al.
2023/0245792 A1* 8/2023 Kotschenruether .... G21B 1/052 376/100

FOREIGN PATENT DOCUMENTS

GB 2306948.7 * 6/2023
JP 2001194477 A * 7/2001
WO WO-2024231500 A1 * 11/2024 ........... F16K 31/002

OTHER PUBLICATIONS

Morisaki, T., et al. "Local island divertor experiments on LHD." Journal of nuclear materials 337 (2005): 154-160. (Year: 2005).*

Feng, Y. Comparison between stellarator and tokamak divertor transport. Plasma Physics and Controlled Fusion. 53(2):024009, 9 pages (2011). DOI: 10.1088/0741-3335/53/2/024009.

(Continued)

*Primary Examiner* — Sharon M Davis

(74) *Attorney, Agent, or Firm* — CANTOR COLBURN LLP

(57) ABSTRACT

The present disclosure may provide methods and systems for exhausting particles from a plasma field using, at least in part, the backside surface of a divertor.

18 Claims, 7 Drawing Sheets

(56) References Cited

OTHER PUBLICATIONS

Komori A. Edge plasma control by local island divertor in LHD. Nuclear Fusion 45. 837-842 (2005).

Komori A. Local Island divertor for the new edge control scenario. Fusion Engineering and Design. 39-40: 241-246 (1998).

Pedersen, Thomas S. et al., First results from divertor operation in Wendelstein 7-X. Plasma Physics and Controlled Fusion 61(1):014035, 12 pages (2018).

Reiter, D. et al., Helium Removal from Tokamaks. Plasma Physics and Controlled Fusion. 33(13):1579-1600 (1991).

Spitzer, L. The stellarator concept. Physics of Fluids 1. 253-264 (1958).

Burnett, C. R. et al., The Divertor, a Device for Reducing the Impurity Level in a Stellarator. The Physics of Fluids 1, 438 (1958).

Conn, Robert W. Nuclear Fusion. The Editors of Encyclopaedia Britannica, Jan. 22, 2025; [Retrieved on Jan. 23, 2025]. Available at URL:https://www.britannica.com/science/nuclear-fusion pp. 1-10.

Kremeyer, Thierry. How to build a divertor—Design criteria for a particle exhaust optimized divertor for W7-X (2023). Available at https://www.researchgate.net/publication/385303691.

Nuclear Fusion. Wikipedia, [Retrieved on Jan. 23, 2025]. Available at URL:https://en.wikipedia.org/wiki/Nuclear_fusion pp. 1-28.

PCT/US2024/051020 International Search Report and Written Opinion dated Dec. 9, 2024.

* cited by examiner

METHODS AND SYSTEMS FOR PARTICLE DIVERSION AND ENHANCED PUMPING EFFICIENCY

CROSS-REFERENCE

This application claims the benefit of U.S. Provisional Application No. 63/589,881 filed Oct. 12, 2023, U.S. Provisional Application No. 63/550,498 filed Feb. 6, 2024, and U.S. Provisional Application No. 63/649,822 filed May 20, 2024, which applications are incorporated herein by reference.

BACKGROUND

Nuclear fusion may offer a high output, low environmental impact method of producing electricity. Stellarators can provide a platform for nuclear fusion energy production.

SUMMARY

In one aspect disclosed herein is a method of removing one or more particles from a plasma reactor, comprising: (a) bringing at least a portion of a plasma comprising the one or more particles in contact with a ballast gas to generate a ballast mixture comprising the one or more particles and the ballast gas; (b) directing the ballast mixture to a divertor; (c) removing at least a portion of the ballast mixture from the plasma reactor.

In some embodiments, the ballast gas comprises one or more of nitrogen, argon, or hydrogen. In some embodiments, the ballast mixture cools a portion of the divertor. In some embodiments, an efficiency of the exhausting is increased by at least about 50%. In some embodiments, the exhausting with the ballast gas is at least about 10% more efficient than an exhausting without the ballast gas. In some embodiments, the ballast gas is injected at a temperature lower than a temperature of the plasma flow. In some embodiments, the ballast gas is injected from a surface opposite the divertor. In some embodiments, the plasma reactor is a stellarator. In some embodiments, the ballast gas is added outside of a main portion of the plasma flow. In some embodiments, the ballast gas is a recycled ballast gas. In some embodiments, the ballast gas is cooled prior to reinjection. In some embodiments, the cooling is configured to extract energy from the plasma reactor. In some embodiments, a lifetime of the divertor is increased by at least about 50% through introduction of the ballast gas. In some embodiments, a temperature of the divertor is at least about 50 degrees Celsius cooler through addition of the ballast gas. In some embodiments, the ballast mixture is directed to a backside surface of the divertor. In some embodiments, the ballast gas is introduced to the plasma reactor via one or more ports. In some embodiments, the one or more ports are located on the divertor. In another aspect disclosed herein is a method of improving an exhaust efficiency of a plasma reactor, comprising: (a) injecting, to a region of the plasma reactor comprising one or more particles, a ballast gas, thereby forming a ballast mixture comprising the ballast gas and the one or more particles; and (b) exhausting the ballast mixture, wherein the exhausting is at an efficiency of at least about 70%. In some embodiments, the ballast gas comprises one or more of nitrogen, argon, or hydrogen. In some embodiments, the ballast mixture cools a portion of a divertor. In some embodiments, an efficiency of the exhausting is increased by at least about 50%. In some embodiments, the exhausting with the ballast gas is at least about 50% more efficient than an exhausting without the ballast gas. In some embodiments, the ballast gas is injected at a temperature lower than a temperature of the plasma flow. In some embodiments, the ballast gas is injected from a surface opposite a divertor. In some embodiments, the plasma reactor is a stellarator. In some embodiments, the ballast gas is added outside of a main portion of the plasma flow. In some embodiments, the ballast gas is a recycled ballast gas. In some embodiments, the ballast gas is cooled prior to reinjection. In some embodiments, the cooling is configured to extract energy from the plasma reactor. In some embodiments, a lifetime of a divertor is increased by at least about 50% through introduction of the ballast gas. In some embodiments, a temperature of a divertor is at least about 50 degrees Celsius cooler through addition of the ballast gas. In some embodiments, the ballast mixture is directed to a backside surface of a divertor. In some embodiments, the ballast gas is introduced to the plasma reactor via one or more ports. In some embodiments, the one or more ports are located on a divertor.

In another aspect disclosed herein is a method of removing one or more particles from a plasma reactor, comprising: (a) providing a pump configured to exhaust the one or more particles from the plasma reactor; (b) introducing a ballast gas to the one or more particles to form a ballast mixture; and (c) using the pump, removing the ballast mixture from the plasma reactor. In some embodiments, the ballast gas comprises one or more of nitrogen, argon, or hydrogen. In some embodiments, the ballast mixture cools a portion of a divertor. In some embodiments, an efficiency of the exhausting is increased by at least about 50%. In some embodiments, the exhausting with the ballast gas is at least about 50% more efficient than an exhausting without the ballast gas. In some embodiments, the ballast gas is injected at a temperature lower than a temperature of the plasma flow. In some embodiments, the ballast gas is injected from a surface opposite a divertor. In some embodiments, the plasma reactor is a stellarator. In some embodiments, the ballast gas is added outside of a main portion of the plasma flow. In some embodiments, the ballast gas is a recycled ballast gas. In some embodiments, the ballast gas is cooled prior to reinjection. In some embodiments, the cooling is configured to extract energy from the plasma reactor. In some embodiments, a lifetime of a divertor is increased by at least about 50% through introduction of the ballast gas. In some embodiments, a temperature of a divertor is at least about 50 degrees Celsius cooler through addition of the ballast gas. In some embodiments, the ballast mixture is directed to a backside surface of a divertor. In some embodiments, the ballast gas is introduced to the plasma reactor via one or more ports. In some embodiments, the one or more ports are located on a divertor. In yet another aspect disclosed herein is a method removing one or more particles from a plasma reactor, comprising exhausting a ballast mixture comprising a ballast gas and the one or more particles from the plasma reactor. In some embodiments, the ballast gas comprises one or more of nitrogen, argon, or hydrogen. In some embodiments, the ballast mixture cools a portion of a divertor. In some embodiments, an efficiency of the exhausting is increased by at least about 50%. In some embodiments, the exhausting with the ballast gas is at least about 50% more efficient than an exhausting without the ballast gas. In some embodiments, the ballast gas is injected at a temperature lower than a temperature of the plasma flow. In some embodiments, the ballast gas is injected from a surface opposite a divertor. In some embodiments, the plasma reactor is a stellarator. In some embodiments, the ballast gas is added outside of a main portion of the plasma flow. In some embodiments, the ballast gas is a recycled ballast gas. In some embodiments, the ballast gas is cooled prior to reinjection. In some embodiments, the cooling is configured to extract energy from the plasma reactor. In some embodiments, a lifetime of a divertor is increased by at least about 50% through introduction of the ballast gas. In some embodiments, a temperature of a divertor is at least about 50 degrees Celsius cooler through addition of the ballast gas. In some embodiments, the ballast mixture is directed to a backside surface of a divertor. In some embodiments, the ballast gas is introduced to the plasma reactor via one or more ports. In some embodiments, the one or more ports are located on a divertor. In an aspect, the present disclosure provides a method of removing one or more particles from a plasma comprising: (a) directing a plasma flow of the plasma to a backside surface of a divertor; and (b) using the divertor, diverting an amount of the one or more particles from the plasma flow to one or more pump channels.

Another aspect disclosed herein is a method of removing one or more particles from a plasma comprising: (a) directing a plasma flow of the plasma to a backside surface of a divertor; and (b) using the divertor, diverting an amount of the one or more particles from the plasma flow to one or more pump channels. In some embodiments, the plasma flow is a portion of a stellarator. In some embodiments, the one or more particles are initially charged particles. In further embodiments, subsequent to the one or more particles arriving at or adjacent to the backside surface of the divertor, the one or more particles are no longer charged. In further embodiments, the one or more particles comprises an alpha particle. In further embodiments, the one or more particles comprises a Tungsten particle. In further embodiments, the one or more particles comprises an impurity from a material of the plasma flow. In some embodiments, the backside surface of the divertor is oriented away from a center of the plasma. In further embodiments, the plasma flow is diverted through one or more channels to the backside surface of the divertor. In some embodiments, (c) further comprises removing the one or more particles from the one or more pump channels using one or more pumps. In further embodiments, the backside surface of the divertor is oriented facing the one or more pumps. In some embodiments, the one or more particles are reintroduced to the plasma flow less than about 10 times per 100 particles before being exhausted from the pump channels. In some embodiments, the divertor is located on a side of a magnetic island within a boundary of the plasma flow. In further embodiments, x-points of a magnetic field of the stellarator are helical in nature. In further embodiments, the x-points have a poloidal magnetic field component. In further embodiments, the x-points have a poloidal and toroidal magnetic field components. In some embodiments, the plasma flow is a scrape-off layer of a plasma. In further embodiments, the plasma further comprises a core plasma portion that is different from the scrape-off layer. In some embodiments, the one or more particles comprise hydrogen, deuterium, or tritium. In still yet a further aspect disclosed herein is a stellarator housing comprising a vacuum chamber configured to contain a plasma in a radial direction and a divertor configured to receive a plasma stream on a surface of the divertor, wherein the surface faces away from a center of the radial direction of the vacuum chamber. In some embodiments, the divertor comprises narrow slits. In some embodiments, the divertor comprises tungsten or a tungsten alloy. In further embodiments, the divertor consists of tungsten or a tungsten alloy. In some embodiments, the divertor is electronically grounded. In still another aspect disclosed herein is a method of exhausting alpha particles from a plasma stream in a stellarator, wherein a content of the alpha particles within the plasma stream is maintained below 10 mol % during operation of the plasma steam. In some embodiments, the content of the alpha particles is reduced using a backside divertor. In another aspect disclosed herein is a method of removing one or more particles from a plasma reactor, comprising: (a) directing a plasma flow comprising one or more impurities from the plasma reactor to a backside surface of a divertor; (b) introducing a ballast gas to the backside surface of the diverter; and (c) exhausting the ballast gas and the one or more impurities from the plasma reactor. In some embodiments, the plasma flow is a portion of a stellarator. In some embodiments, the one or more particles are initially charged particles. In some embodiments, subsequent to the one or more particles arriving at or adjacent to the backside surface of the divertor, the one or more particles are no longer charged. In some embodiments, the one or more particles comprises an alpha particle. In some embodiments, the one or more particles comprises a Tungsten particle. In some embodiments, the one or more particles comprises an impurity from a material of the plasma flow. In some embodiments, the backside surface of the divertor is oriented away from a center of the plasma. In some embodiments, the plasma flow is diverted through one or more channels to the backside surface of the divertor. In some embodiments, the method further comprises (c) removing the one or more particles from the one or more pump channels using one or more pumps. In some embodiments, the backside surface of the divertor is oriented facing the one or more pumps. In some embodiments, the one or more particles are reintroduced to the plasma flow less than about 10 times per 100 particles before being exhausted from the pump channels. In some embodiments, the divertor is located on a side of a magnetic island within a boundary of the plasma flow. In some embodiments, x-points of a magnetic field of the stellarator are helical in nature. In some embodiments, the x-points have a poloidal magnetic field component. In some embodiments, the x-points have a poloidal and toroidal magnetic field components. In some embodiments, the plasma flow is a scrape-off layer of a plasma. In some embodiments, the plasma further comprises a core plasma portion that is different from the scrape-off layer. In some embodiments, the one or more particles comprise hydrogen, deuterium, or tritium. In another aspect, the present disclosure provides a stellarator housing comprising a vacuum chamber configured to contain a plasma in a radial direction and a divertor configured to receive a plasma stream on a surface of the divertor, wherein the surface faces away from a center of the radial direction of the vacuum chamber. In some embodiments, the divertor comprises narrow slits. In some embodiments, the divertor comprises tungsten or a tungsten alloy. In some embodiments, the divertor consists of tungsten or a tungsten alloy. In some embodiments, the divertor is electronically grounded. In another aspect, the present disclosure provides a method of exhausting alpha particles from a plasma stream in a stellarator, wherein a content of the alpha particles within the plasma stream is maintained below 10 mol % during operation of the plasma steam. In some embodiments, the content of the alpha particles is reduced using a backside divertor.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
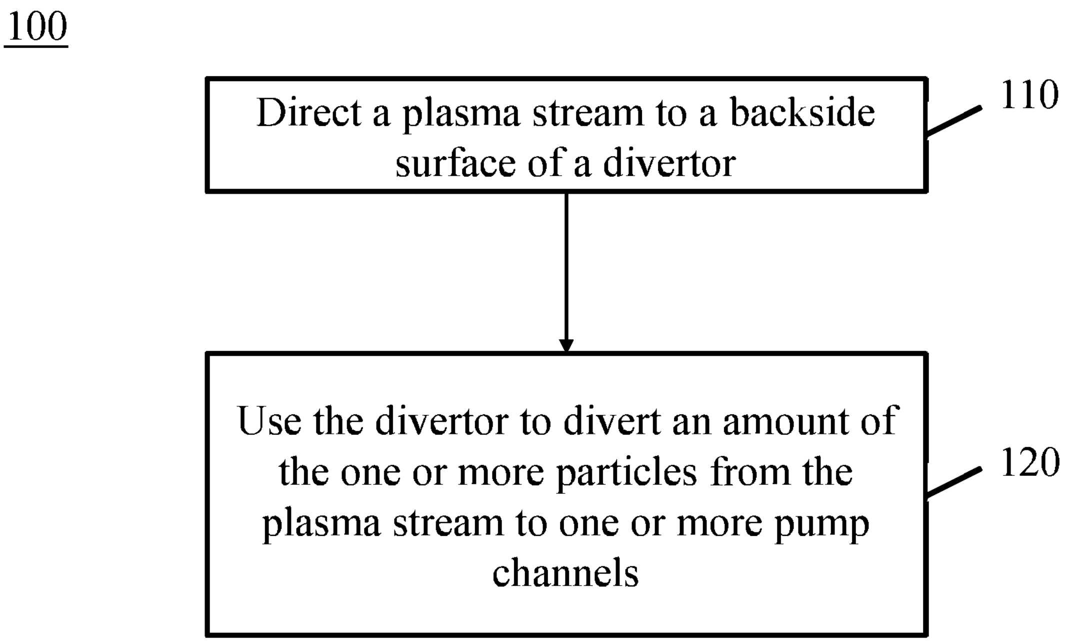
FIG. 1 shows a flowchart of a method for removing one or more particles from a plasma, according to some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

In some examples, the present disclosure provides methods and systems for diverting and exhausting particles from a plasma. The plasma may comprise a hot core plasma (e.g., a core plasma at a temperature of about 100 million degrees Celsius or 10,000 electron-volts (eV)) and a cooler edge plasma (e.g., an edge plasma at a temperature of about 100,000 degrees Celsius or less than 10 eV). The edge plasma region may be the region where the exhaust of the particles predominantly occurs. The core plasma region may be where fusion processes predominantly occur. The plasma may be a part of a fusion power producing plasma (e.g., a stellarator, etc.). The fusion in the fusion power-producing plasma may involve the fusion of a plurality of fusile materials (e.g., deuterium and tritium) into a higher atomic-number nucleus. In the example of deuterium-tritium fusion, the fusion can produce a helium nucleus (e.g., alpha particle), a neutron, and 17.6 megaelectron volts of energy. In a fusion reaction, the fusion materials can be in a fully ionized plasma state. As such, the fusion materials can be controlled via use of magnetic fields. The use of magnetic field can cause the ionized products of a fusion reaction (e.g., alpha particles) to be contained for extended periods of time in the core plasma, while a neutron produced by the fusion reaction can escape due to the lack of charge of the neutron. The fusion produced alpha particle can thermalize with the plasma, thus imparting a portion of the energy of the fusion event into the plasma, which can maintain the temperature of the plasma, maintain the fusion process, and provide harvestable energy.

Once thermalized, the alpha particle can reduce the fusion rate of the plasma, as fusion processes involving alpha particles can have lower reaction rates than those of a deuterium and tritium mix. This can reduce the efficiency of the power-producing plasma by diluting the concentration of the fusion reactants, for example deuterium-tritium. As such, the exhaust of the fusion products, along with exhaust of the other non-reactive contaminates (e.g., ions originating from the containment vessel of the power-producing plasma, impurities in the reactant gasses, etc.), can improve the operation of the power-producing plasma and increase the efficiency of the power-producing plasma.

A process for removing ions from the power-producing plasma may comprise neutralizing the ions, at which point they will no longer be confined in the magnetic field and can be removed from the power-producing plasma. This can be accomplished with a divertor (e.g., a member configured to neutralize the plasma, concentrate the newly neutral atoms, ensure the atoms are removed from the plasma and not re-ionized, remove heat from the power-producing plasma, etc.). By contacting the plasma with a divertor body, the constituent ions of the plasma can be neutralized and removed from the power-producing plasma. Alternatively, the divertor can facilitate a volumetric neutralization of the plasma with little or no contact between the plasma particles and the divertor plates. For example, both free electrons in the plasma and ions can be exhausted at a similar rate, resulting in substantially little change in the overall ionic balance of the plasma. In some cases, the ions and the electrons can be exhausted without contacting the divertor, leaving the overall charge on the divertor neutral. In some cases, the electrons and ions can impact the divertor at a similar rate, resulting in a time averaged neutral divertor.

The benefits of removing ions from the power-producing plasma by having the edge plasma interact with a divertor body may include, but are not limited to reduced concentrations of impurities, a higher fusion energy output, the ability to maintain the plasma density at a predetermined value (e.g., a value optimized for energy production), the ability to concentrate the heat flowing out of the plasma onto components configured for heat removal (e.g., components engineered to withstand the heat that is exiting the plasma, components configured to transfer the heat to a heat-based electrical generator), the spreading of the heat flowing out of the plasma over larger areas so as to not thermally overload the components of the power production system, the ability to prevent impurities introduced from outside of the plasma from entering the core plasma, or the like, or any combination thereof.

In some cases, a mean time between replacement of the components of the power-producing plasma reactor can be increased by at least about a factor of at least about 1.1, 1.5, 2, 2.5, 3, 3.5, 4, 4.5, 5, or more with the use of a backside contact divertor.

FIG. 1 shows a flowchart of a method 100 for removing one or more particles from a plasma (e.g., a magnetically confined plasma), according to some embodiments. In an operation 110, the method 100 can comprise directing a flow of edge plasma to a backside surface of a divertor.

The backside surface of the divertor may be a portion of a stellarator. For example, the backside divertor can be a portion of a fusion stellarator.

In an operation 120, the method 100 can comprise using the divertor to divert an amount of the one or more particles from the plasma to one or more pump channels.

The one or more particles may be charged particles. The charged particles may become neutral, for example, by interaction with the divertor surface (e.g., surface recombination). The charged particles may become neutral, for example, by interactions between electrons and ions away from a surface of the divertor (e.g., a volumetric recombination). The one or more particles may be neutral particles. The neutral particles may become charged particles, for example, by interactions between electrons and the neutral particles (e.g., electron-impact ionization). For example, electrons can impact the housing and generate charged particles ejected from the wall of the housing. The neutral particles may become charged particles, for example, by interaction between the neutral atoms and photons (e.g., photoionization). Examples of charged particles include, but are not limited to, alpha particles, other fusion products, hydrogen ions, particles originated from the walls of the power-producing plasma apparatus (e.g., tungsten particles, iron particles, water particles, oxygen particles, etc.), impurities from a material of the plasma stream, or the like, or any combination thereof. The neutral particles may have an increased likelihood, rate, or efficiency of being exhausted by the pumping system in a system comprising a backside divertor as compared to a system comprising a front side divertor of at least about 5, 10, 15, 20, 25, 30, 35, 40, 45, 50, 55, 60, 65, 70, 75, 80, 85, 90, 95, 100, or more percent.

The backside surface of the divertor can be oriented away from a central plasma region. For example, the central plasma region can be positioned above a divertor, and an edge region of the plasma stream can contact the backside of the divertor. The edge region may be streaming through one or more channels to the backside of the divertor. The plasma stream may be directed through at least about 1, 2, 3, 4, 5, 6, 7, 8, 9, 10, or more channels to reach the backside of the divertor.

The backside divertor described herein may enable a fusion power-producing plasma to operate at one or more improved parameters. For example, a stellarator comprising a backside divertor may operate with a lower level of impurities, which may enable lower losses and a higher fusion power output than a stellarator that does not comprise a backside divertor. The backside divertor may be more effective than other exhaust systems at removing impurities or fusion waste from a plasma, which can also improve fusion power output. Alternatively, or in addition, a backside divertor as described herein may be more effective at removing impurities or fusion waste from one or more surfaces of the reactor before those impurities or waste particles enter the plasma region of the power-producing plasma, which may increase fusion power output and enable the possibility of using a wider range of materials for the construction of in-vessel components (e.g., components used to contain the power-producing plasma).

In particular, a backside divertor may improve the efficiency of a power-producing plasma by causing the neutralization of waste particles (e.g., alpha particles) on a surface that directs those waste particles away from a plasma region of the power-producing plasma. The structural separation between the incident site of the neutralization of the waste particles and the fusion region of the plasma stream may improve waste removal efficiency and thereby the efficiency of the plasma region and plasma reactor.

In some cases, the one or more particles may be removed from the one or more pump channels using one or more pumps. Examples of pumps include, but are not limited to, diffusion pumps, turbomolecular pumps, ion pumps, cryopumps, getter pumps, or the like, or any combination thereof. The one or more pumps can remove the one or more particles from a plasma chamber, thereby improving the purity of the atmosphere of the chamber. The backside surface of the divertor may be oriented facing the one or more pumps. The orienting the backside surface of the divertor towards the one or more pumps can reduce a rate of reabsorption of the neutralized particles into the plasma core. For example, after being neutralized on the backside surface of the divertor, a helium atom can be directed away from the plasma from the contacting and ricochet off of the backside of the divertor. In this example, the helium atom can be directed away from the plasma by merit of the angle of impact on the backside of the divertor and the fact that the main part of the plasma is on the other side of the divertor.

Particles that are diverted out of the edge flow may be more efficiently removed from the plasma reactor through use of a backside divertor. Particles that do re-enter the plasma and are re-ionized can be redirected back towards the backside surface of the divertor instead of back into the main body of the plasma. This can, in turn, reduce a reintroduction rate of impurities into the plasma, improving the performance of the plasma system. Neutral particles can be reintroduced into the edge plasma flow and may be re-ionized one or more times, thereby cooling the plasma (e.g., due to the energy used to ionize the neutral particle). The cooler edge plasma flow can result in lower impurity concentrations in the core plasma, as a cooler edge plasma may produce fewer impurities when contacting the divertor and other plasma facing components.

The divertor can be located on the side of a magnetic island within a boundary of the plasma stream. The magnetic island may be generated to provide a region of lower speed plasma movement, which can increase the amount of interaction of the plasma with the backside surface of the divertor. The magnetic field configured to contain the plasma stream may have one or more x-points. The x-points may be configured to direct ions from the plasma stream to the divertor. X-points of a magnetic field used to contain the plasma stream may be helical in nature. In some cases, the x-points have a poloidal magnetic field component, a toroidal magnetic field component, or the like, or any combination thereof.

The divertor components may be placed inside a magnetic-island chain or in a stochastic region of the magnetic field of the power-generating plasma. The divertor components can cool off in the backside region of the divertor. The divertor components may be configured such that the primary interaction region between the plasma and the divertor is the backside region of the divertor. For example, the divertor components can have any shape such that the primary interaction region is the backside of the divertor. The divertor components may be configured to permit the outflowing plasma from the edge plasma to stream towards the backside of the divertor. The divertor may comprise narrow slits configured to isolate the plasma flow along the magnetic field lines on a backside of the divertor.

The divertor may be configured as described elsewhere herein. For example, the divertor can be configured to be impacted with ions on a backside of the divertor, thereby neutralizing the ions and removing them from the plasma stream. The divertor can comprise slits configured to permit movement of ions from the plasma to the backside of the divertor, isolate magnetic field lines on the backside of the divertor, or the like, or any combination thereof. The divertor and/or the stellarator coil housing can comprise materials such as, but not limited to, tungsten, steel, iron, tantalum, lithium metallic alloys, ceramics, composite materials, or the like, or any combination thereof. In some cases, the divertor is electronically grounded. In some cases, the divertor is biased to one or more voltages. In some cases, the divertor is insulated (e.g., electronically floating).

The use of the backside of the divertor for impacting particles can introduce new materials into the design space for stellarator coil housings. For example, the stellarator housing may not have to be as resilient to the effects of the plasma due to the more efficient exhausting of impurities from the plasma through use of the backside divertor. In this example, a material that produces additional impurities can be used as the material for the stellarator coil housing since the additional impurities can be more effectively removed. In this way, the use of a backside divertor can open up the design space of stellarator coil housings. Similarly, the use of a backside divertor can permit use of new materials for the construction of the divertor components, plasma-facing components, or the like, or any combination thereof. The new materials may be used due to the generation of a cool plasma edge by use of the backside divertor.

In another aspect, the present disclosure may provide a method of exhausting alpha particles from a plasma stream in a stellarator. A content of the alpha particles within the plasma stream may be maintained below at most about 50, 45, 40, 35, 30, 25, 20, 15, 10, 9, 8, 7, 6, 5, 4, 3, 2, 1, or less mol percent during operation of the plasma. The content of the alpha particles may be reduced through use of a backside divertor.

Figure 2:
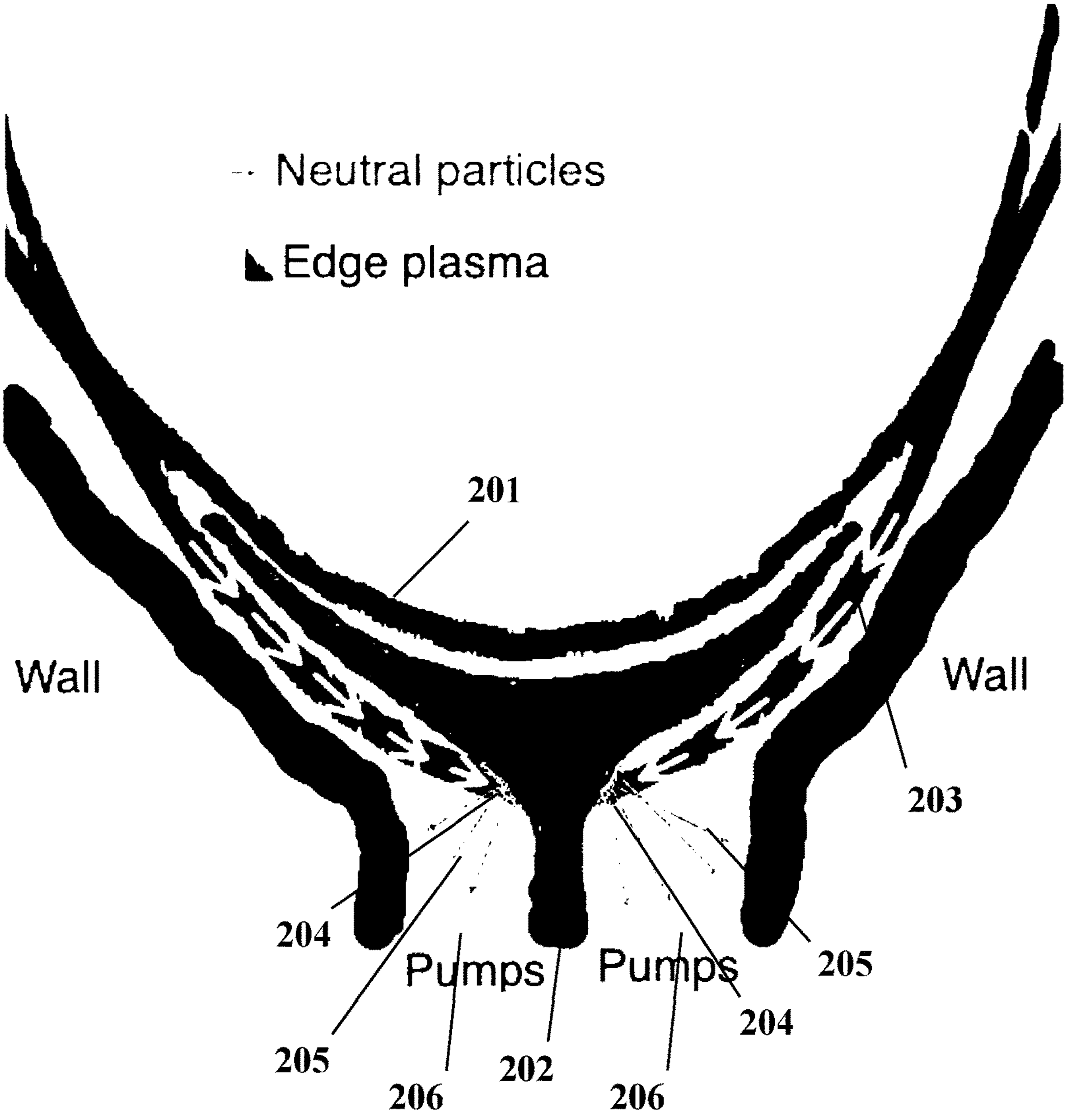
FIG. 2 shows a plasma flow being directed towards a backside surface of a divertor, according to some embodiments.

FIG. 2 shows a plasma flow being directed towards a backside surface of a divertor, according to some embodiments. The plasma flow shown can be a two-dimensional slice of a three-dimensional field that is extending out of the plane of the image. The plasma field 201 can further extend off of the top of the image. As such, the portion of the plasma flow pattern 201 can be an edge of the plasma field. The divertor 202 can be positioned such that the plasma flow does not impact the divertor on the front face of the divertor (e.g., the portion of the divertor facing the plasma field 201). Instead, the plasma flow can be directed through channels 203, with the direction of plasma flow being along the indicated arrows. The plasma can impact the diverted at sites 204, become neutral particles 205, and be diverted towards the pumps along the pump channels 206.

Figure 7:
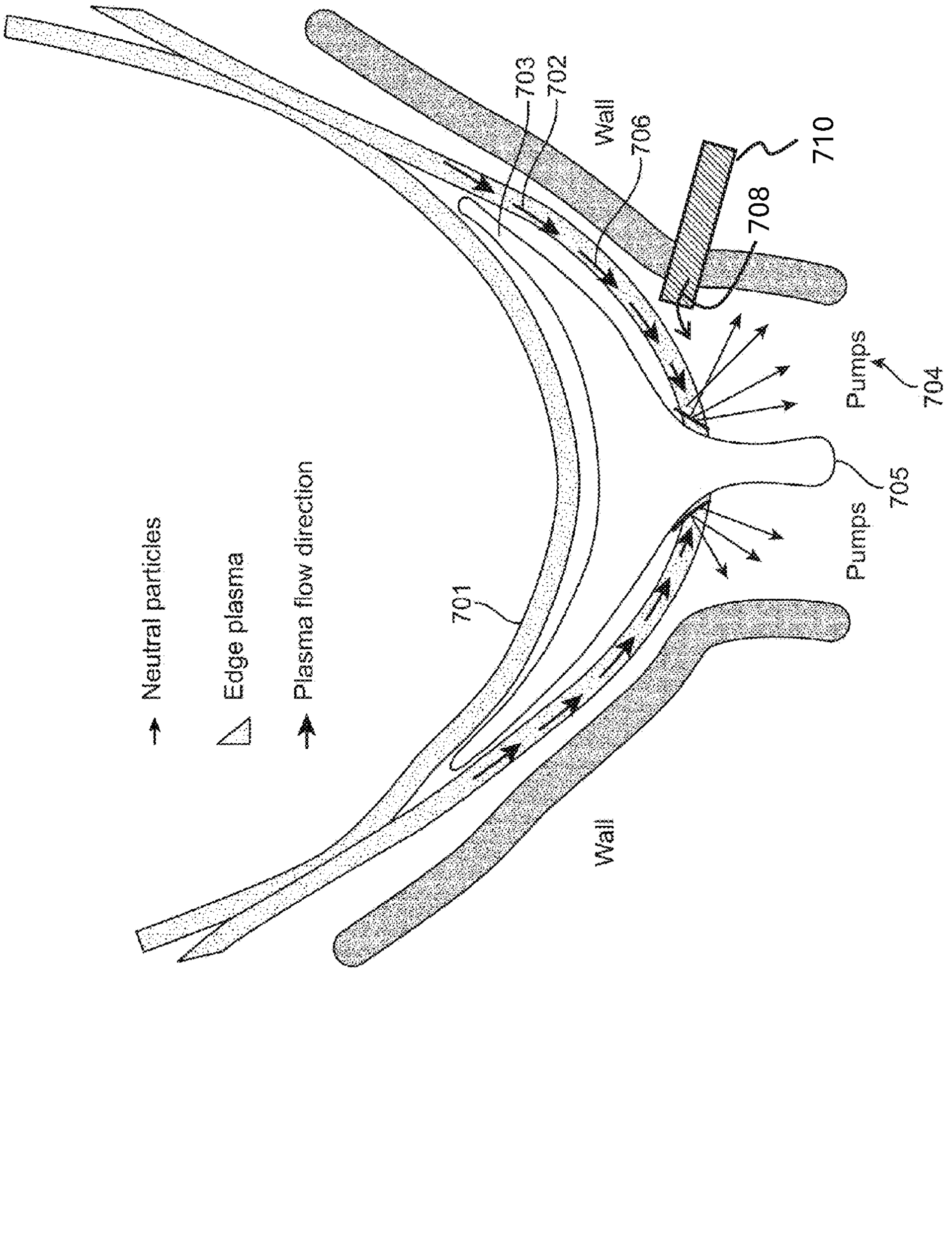
FIG. 7 shows a plasma flow being directed towards a backside surface of a divertor with an added ballast gas, according to some embodiments.

FIG. 7 shows a plasma flow being directed towards a backside surface of a divertor with an added ballast gas, according to some embodiments. The plasma field 701 can have a portion of the plasma field 702 diverted around the backside of the divertor 705, and a ballast gas 708 via injector 710 as described elsewhere herein can be added to the channel 706 anywhere along the backside of the divertor 703. The ballast gas along with other species from the portion of the plasma field can then be exhausted by the pumps 704.

In some cases, the pumping efficiency of the pumping systems in high vacuum systems can be improved by the introduction of an additional ballast gas (e.g., an additional gas added to increase the pressure the pumps are removing). For example, pumping systems can have improved capture rates (e.g., rates of capture of exhaust species), reduced reintroduction rates (e.g., reduced rates of exhaust being reintroduced upstream of the pumping system), enhanced lifetimes, and the like, when operating under higher exhaust fluxes (e.g., pressures, amounts of exhaust material, etc.). In an example, an added flow of gas directed towards the pumps in a high vacuum system can provide enhanced gas density at the pumping system as well as direct other exhaust particles towards the pumping system. For example, the addition of a ballast gas can help trap a low-density gas in the higher density ballast gas stream, which can, in turn, improve exhaust of the low-density gas.

The ballast gas stream can be introduced into the system on the backside of a divertor as described elsewhere herein. For example, the ballast gas stream can be introduced through at least about 1, 2, 3, 4, 5, 6, 7, 8, 9, 10, 20, 30, 40, 50, or more nozzles located on the backside of the divertor. The ballast gas may be introduced in a subsonic stream. The ballast gas may be introduced in a supersonic stream. Examples of ballast gasses include, but are not limited to, noble gasses (e.g., argon, helium, neon, etc.), gaseous forms of other elements (e.g., lithium, mercury, etc.), plasma gas components (e.g., hydrogen), or the like, or any combination thereof. The placement of the inlet(s) for the ballast gas stream may be at any point along the backside of the divertor. The ballast gas may be configured to aid in a cooling of the plasma or the portions thereof that are exhausted from the system. For example, the ballast gas can be introduced at a lower temperature than the exhaust from the plasma, and the ballast gas can be configured to cool the exhaust gases. The ballast gas may aid in preserving high wear parts of the stellarator by reducing the temperature or improving the removal of the exhaust gasses. The ballast gas may reduce a heat flux at an impact point on the backside of the divertor by at least about 2, 3, 4, 5, 6, 7, 8, 9, 10, or more times. The ballast gas and the exhaust from the stellarator may be filtered and portions of the mixture (e.g., unreacted plasma gas) can be reused in the stellarator. For example, the ballast gas, unreacted hydrogen, helium, and other impurities can be exhausted from the stellarator, the hydrogen gas can be separated from the other gases, and the hydrogen can be recycled into the stellarator. In some cases, the filtering can comprise use of thin metal foils to permit flow of hydrogen gas while trapping other species in the filtering foils.

Computer Systems

Figure 3:
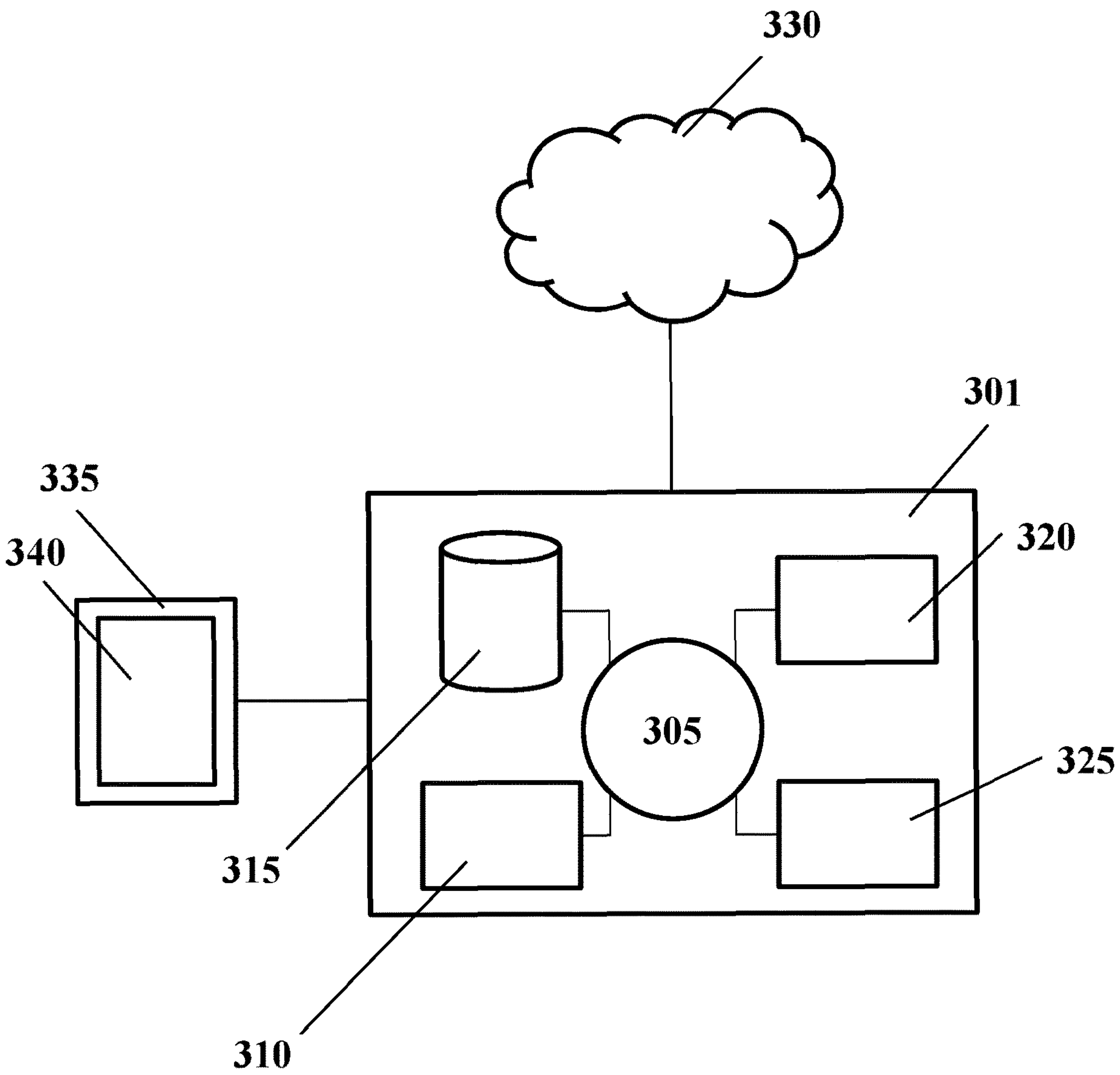
FIG. 3 shows a computer system that is programmed or otherwise configured to implement methods provided herein.

The present disclosure provides computer systems that are programmed to implement methods of the disclosure. FIG. 3 shows a computer system 301 that is programmed or otherwise configured to control a plasma flow or at least a portion of a magnetic field of a stellarator. The computer system 301 can regulate various aspects of the present disclosure, such as, for example, the movement of a plasma flow and the direction of the plasma flow to a backside surface of a divertor. In some cases, the computer system 301 can control the magnetic field itself, thereby impacting the plasma flow and its interaction with the divertor. The computer system 301 can be an electronic device of a user or a computer system that is remotely located with respect to the electronic device. The electronic device can be a mobile electronic device.

The computer system 301 includes a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340 for providing, for example, monitoring and controlling a plasma field. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm can, for example, control the influx and outflux of plasma reagents, as well as monitor the composition of the plasma.

The following examples are illustrative of certain systems and methods described herein and are not intended to be limiting.

Example 1—Stellarators Comprising Backside Surface Contract Divertors

Figure 4:
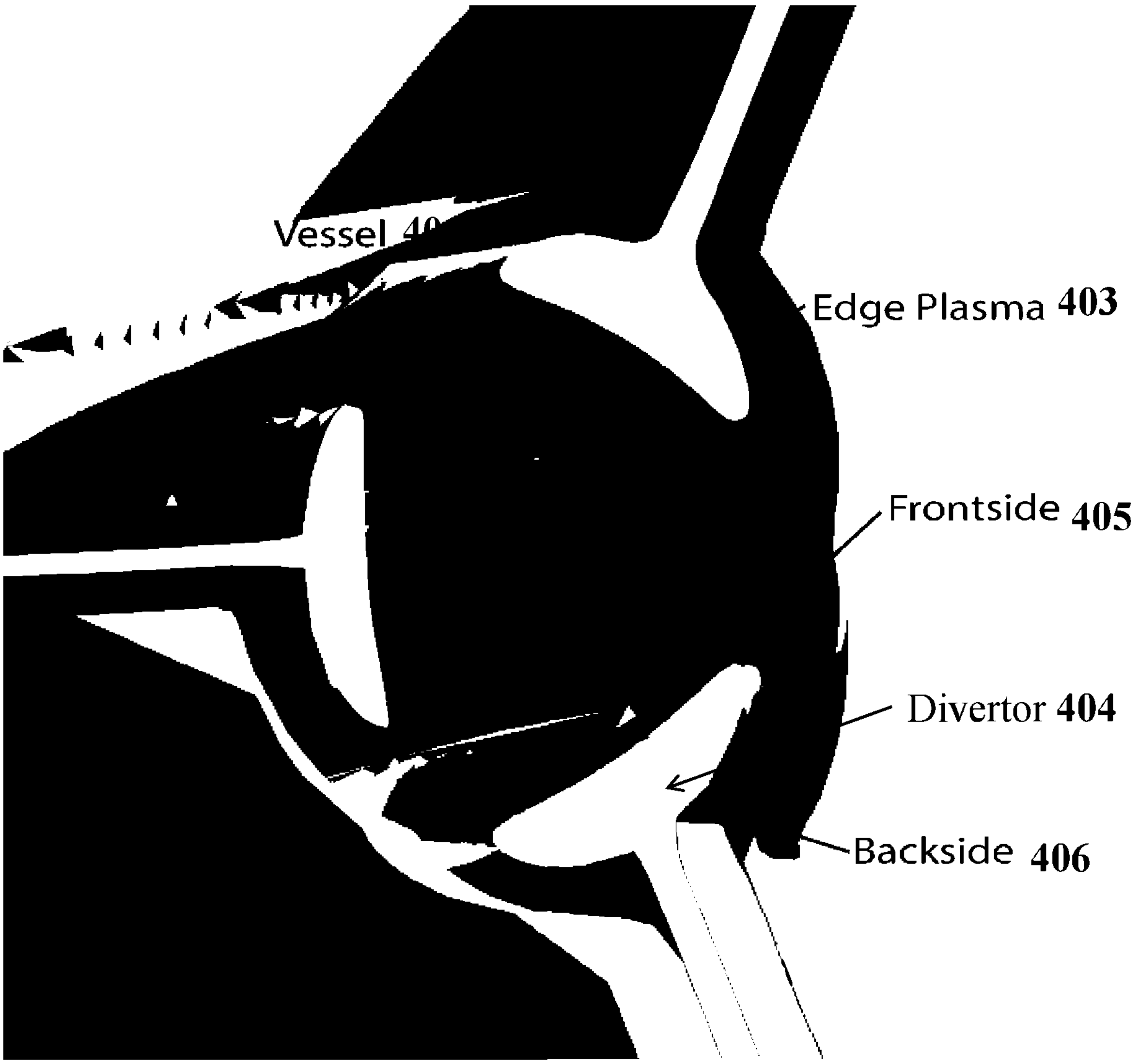
FIGS. 4-6 show examples of a stellarator power-producing reactor, according to some embodiments.
Figure 5:
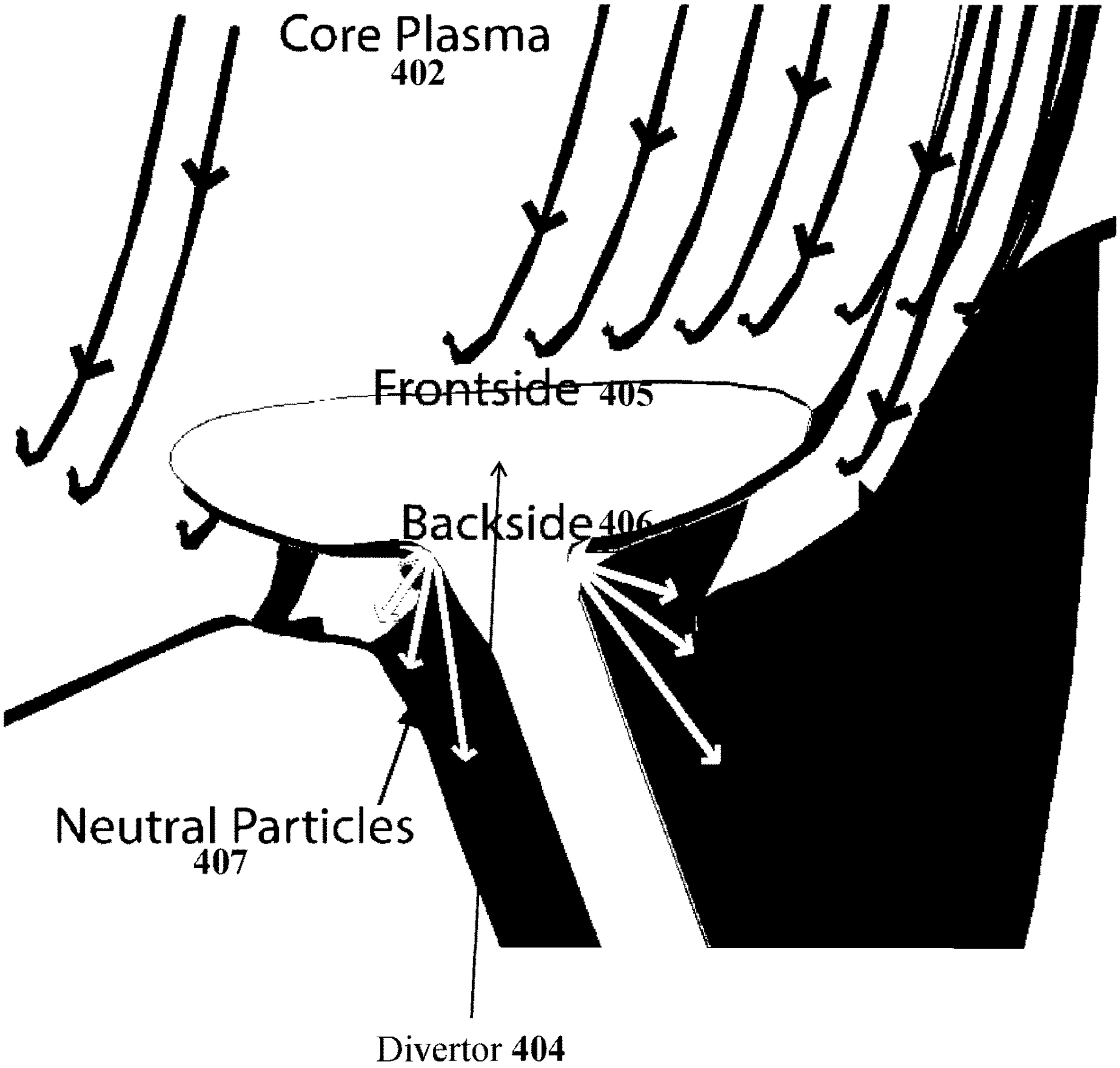
Figure 6:
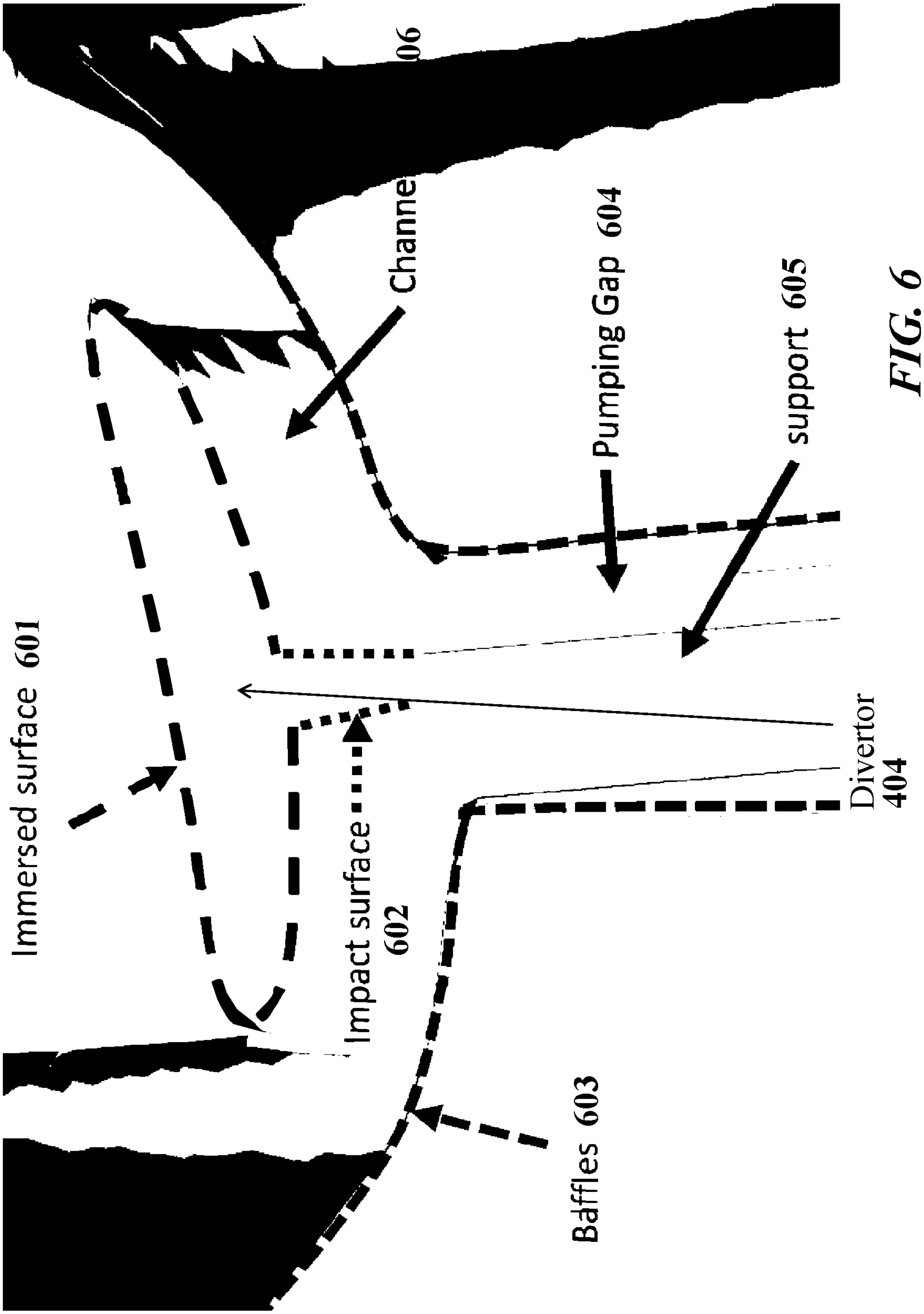

FIGS. 4-6 show examples of a stellarator power-producing reactor, according to some embodiments. The vessel 401 can be configured to contain the plasma, which can comprise the core plasma 402 and the edge plasma 403. The core plasma may not have a substantial movement, while the edge plasma may flow. The divertor 404 can comprise a frontside 405 and a backside 406 as described elsewhere herein. As seen in FIG. 5, the field lines of the edge plasma can have a net impulse towards the backside of the divertor, where the charged particles of the edge plasma can interact with the backside of the divertor or with counterions in the plasma to generate neutral particles 407. As shown in FIG. 5, the neutral particles can be directed away from the core plasma and can have the body of the divertor placed between them and the core plasma, which can reduce reintroduction of exhausted impurities to the core plasma.

FIG. 6 shows a detailed example of a divertor 404, according to some embodiments. The divertor can comprise an immersed surface 601 that is configured to be immersed in the edge plasma. Channel gaps 606 between the divertor and the baffles 603 of the chamber can be configured to permit a flow from the edge plasma to the backside surface of the divertor, which includes the impact surface 602. The impact surface can be configured to have the plasma particles impact the impact surface, thereby directing the plasma particles away from the core plasma and into the pumping gaps 604. The pumping gaps can be coupled to one or more vacuum pumps configured to exhaust the particles from the vessel, thereby removing them from the plasma and not permitting them to be reintroduced. The divertor may be supported by one or more supports 605, thereby permitting the divertor to be positioned away from the baffles 603 and forming the channel gaps 606.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of removing one or more particles from a plasma comprising:

directing a scrape-off layer of said plasma to a backside surface of an island divertor, wherein said backside surface is disposed on a side of said divertor opposite a center of said plasma;

injecting from a wall onto the backside surface of the island divertor a ballast gas, where the ballast gas is at a temperature lower than an exhaust temperature of the plasma; and using said divertor, diverting an amount of said one or more particles from said scrape-off layer to one or more pump channels.

2. The method of claim 1, wherein said plasma flow is a portion of a stellarator.

3. The method of claim 2, wherein said divertor is located on a side of a magnetic island within a boundary of said scrape-off layer.

4. The method of claim 3, further comprising forming, using said stellarator, x-points of a magnetic field that are helical in nature.

5. The method of claim 4, wherein said x-points have a poloidal magnetic field component.

6. The method of claim 4, wherein said x-points have a poloidal and a toroidal magnetic field component.

7. The method of claim 1, wherein said one or more particles are charged particles prior to an interaction with said divertor.

8. The method of claim 7, further comprising neutralizing said one or more charged particles using said backside surface of said divertor.

9. The method of claim 7, wherein said one or more particles comprises an alpha particle.

10. The method of claim 7, wherein said one or more particles comprises a tungsten particle.

11. The method of claim 7, wherein said one or more particles comprises an impurity from a material of said scrape-off layer.

12. The method of claim 1, wherein said scrape-off layer is diverted through one or more flow channels to said backside surface of said divertor.

13. The method of claim 1, further comprising (e) removing said one or more particles from said one or more pump channels using one or more pumps.

14. The method of claim 13, wherein said backside surface of said divertor is oriented facing said one or more pumps.

15. The method of claim 1, further comprising reintroducing said one or more particles to said scrape-off layer less than about 10 times per 100 particles before exhausting said one or more particles through said pump channels.

16. The method of claim 1, wherein said plasma further comprises a core plasma portion that is different from said scrape-off layer.

17. The method of claim 1, wherein said one or more particles comprise hydrogen, deuterium, or tritium.

18. The method of claim 1, wherein said divertor comprises tungsten or a tungsten alloy.

* * * * *